United States Patent
Hsieh et al.

(10) Patent No.: US 8,290,309 B2
(45) Date of Patent: Oct. 16, 2012

(54) SUPER-RESOLUTION METHOD FOR IMAGE DISPLAY

(75) Inventors: Chen-Chiung Hsieh, Pingjhen (TW);
Po-Han Chuan, Taipei (TW);
Meng-Chao Kao, Taipei (TW)

(73) Assignee: Chunghwa Picture Tubes, Ltd., Bade, Taoyuan County (TW)

( * ) Notice: Subject to any disclaimer, the term of this patent is extended or adjusted under 35 U.S.C. 154(b) by 276 days.

(21) Appl. No.: 12/848,095

(22) Filed: Jul. 30, 2010

(65) Prior Publication Data
US 2011/0221966 A1 Sep. 15, 2011

(30) Foreign Application Priority Data
Mar. 10, 2010 (TW) .............................. 99106962 A

(51) Int. Cl.
*G06K 9/32* (2006.01)
*G06F 15/00* (2006.01)

(52) U.S. Cl. .................. 382/299; 382/159; 348/208.13; 358/1.2

(58) Field of Classification Search ........... 382/100–322
See application file for complete search history.

(56) References Cited

U.S. PATENT DOCUMENTS

| | | | | |
|---|---|---|---|---|
| 5,842,194 | A * | 11/1998 | Arbuckle | 706/52 |
| 6,263,103 | B1 * | 7/2001 | Freeman et al. | 382/173 |
| 6,380,934 | B1 * | 4/2002 | Freeman et al. | 345/419 |
| 6,400,310 | B1 * | 6/2002 | Byrnes et al. | 342/115 |
| 6,496,184 | B1 * | 12/2002 | Freeman et al. | 345/419 |
| 6,766,067 | B2 * | 7/2004 | Freeman et al. | 382/299 |
| 6,895,375 | B2 * | 5/2005 | Malah et al. | 704/219 |
| 7,209,883 | B2 * | 4/2007 | Nefian | 704/256 |
| 7,233,898 | B2 * | 6/2007 | Byrnes et al. | 704/246 |
| 7,454,037 | B2 * | 11/2008 | Higgins | 382/103 |
| 7,856,120 | B2 * | 12/2010 | Porikli et al. | 382/103 |
| 2003/0074191 | A1 * | 4/2003 | Byrnes et al. | 704/203 |
| 2011/0019026 | A1 * | 1/2011 | Kameyama | 348/222.1 |

* cited by examiner

*Primary Examiner* — Manav Seth
(74) *Attorney, Agent, or Firm* — Chih Feng Yeh; Huntington IP Consulting Co., Ltd.

(57) ABSTRACT

The present invention discloses a super-resolution method for image display. The method comprises: receiving a low resolution image; dividing the low resolution image into a plurality of regions; finding high resolution patches in a pre-trained database; pasting the high resolution patches back to the plurality of regions by puzzle-form process or oblique-form process and computing the compatibility utilizing a two-dimensional hidden Markov model process; and generating a super-resolution image.

12 Claims, 8 Drawing Sheets

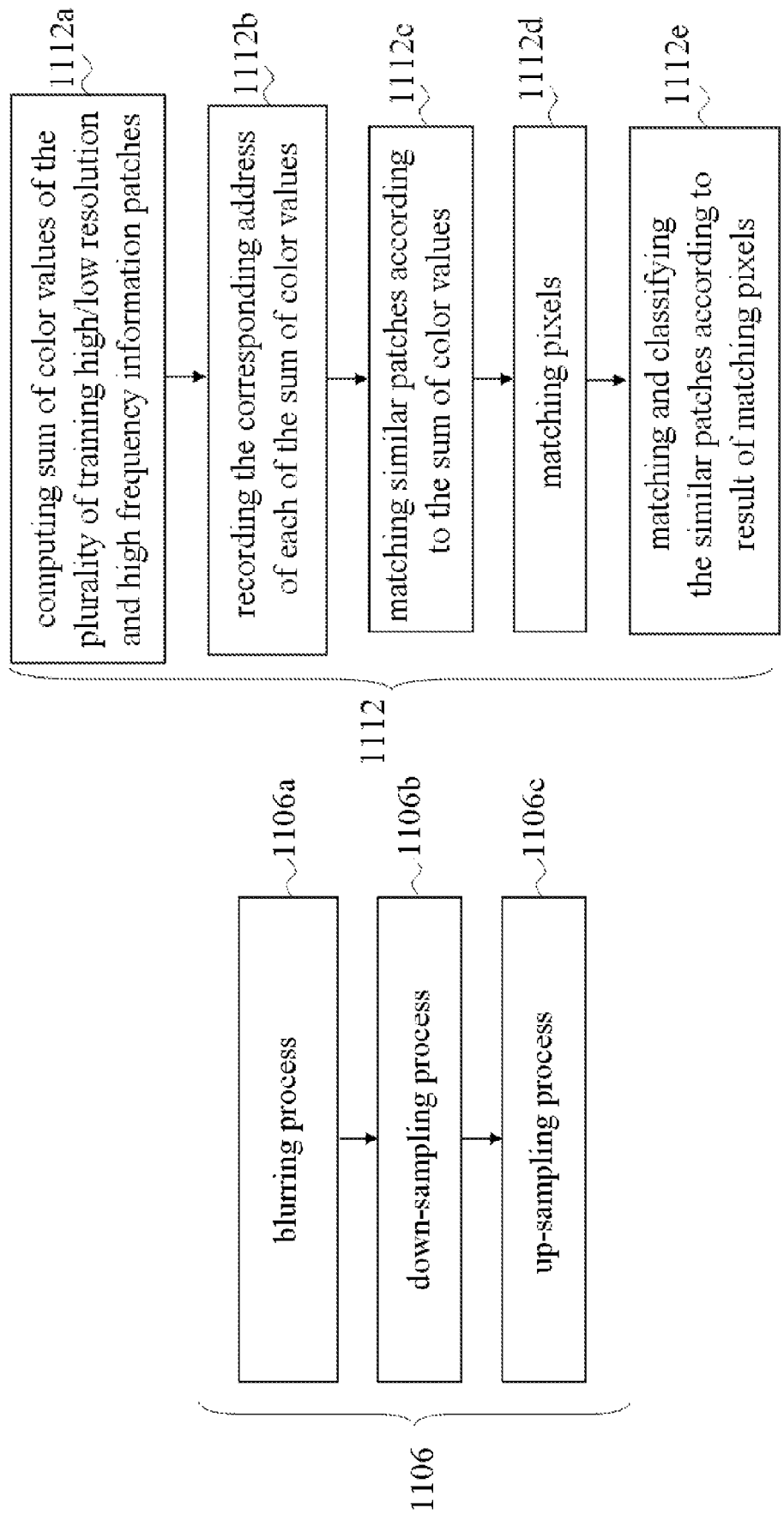

SUPER-RESOLUTION METHOD FOR IMAGE DISPLAY

CROSS-REFERENCE TO RELATED APPLICATION

This present application claims priority to TAIWAN Patent Application Serial Number 099106962, filed Mar. 10, 2010, which is herein incorporated by reference.

TECHNICAL FIELD

The present invention is generally related to an image processing method and, more particularly, to a super-resolution method for image display which utilizes 2D hidden Markov model.

DESCRIPTION OF THE RELATED ART

With the development and the popularization of the diverse displaying technologies, various high definition displaying apparatuses (monitor, television, etc.) are now very popularly used in general families or specific workplaces. The standard evolves from earlier standard definition (SD) standard to now popular high definition (HD) standard or full high definition (full HD) standard. The full HD standard may provide "1920× 1080" resolution, while some professional display monitors, such as the monitors for entertainment uses, medical uses, or other uses, may provide resolution higher than the full HD standard.

For best utilizing the high definition ability of the monitor, the user may need various high resolution signal sources, such as high resolution images or video sequences, to provide optimized display effect. The signals are provided from widespread sources, such as digital camera, digital video recorder, wired/wireless set-top box, TV game player, CD/DVD player, Blu-ray player, computer, etc. The user may also play or download various streamed images or video sequences from a remote computer via the internet. However, among the above-mentioned sources, the provided signals are usually without satisfied resolution. For example, the cable TV source always provides video with only "640×480" resolution in Taiwan. Further, the streamed videos transferred via internet are always being compressed as a lower resolution for providing a higher transmission rate. Furthermore, even a relative high resolution image or video sequence may exist local cloudy caused by improper focusing and/or other reasons. Therefore, for various signal sources, it is needed to improve the signal resolution.

SUMMARY

One purpose of the present invention is to separate the luminance and the chrominance signals of a high resolution image and to implement super-resolution process with only the chrominance signal. By neglecting the luminance signal, the data volume of the high resolution image and the complexity of the computation may be reduced.

Another purpose of the present invention is to paste back the patches by puzzle-form process or oblique-form process by the 2D hidden Markov model, for improving the efficiency of the whole process. Upon the peak signal to noise ratio (PSNR) result, it is observed that the quality of the image is improved.

For the above purpose, in one aspect of the present invention, a super-resolution method for image display is provided. The method comprises the steps of: utilizing a high resolution image to acquire a plurality of training high resolution and high frequency information patches and a plurality of training low resolution and high frequency information patches; training the plurality of training high resolution and high frequency information patches and the plurality of training low resolution and high frequency information patches, for acquiring a corresponding relationship for establishing a training database; receiving a low resolution image; dividing the low resolution image into a plurality of regions according to the size of the plurality of training low resolution and high frequency information patches; finding one of the plurality of training low resolution and high frequency information patches being similar to each of the plurality of regions, and finding one of the plurality of training high resolution and high frequency information patches corresponding to the one of the plurality of training low resolution and high frequency information patches in the training database; controlling a super-resolution module to paste the high resolution and high frequency information patches back to the plurality of regions by puzzle-form process or oblique-form process and to compute the compatibility utilizing a two-dimensional hidden Markov model process by a processor; and generating a super-resolution image.

In another aspect of the present invention, a super-resolution method for image display is provided. The method comprises: receiving a low resolution image; dividing the low resolution image into a plurality of regions; finding high resolution patches in a pre-training database; controlling a super-resolution module, by a processor, to paste the high resolution patches back to the plurality of regions by puzzle-form process or oblique-form process and to compute the compatibility utilizing a two-dimensional hidden Markov model process; and generating a super-resolution image.

By referring the following description and illustration of the embodiments and the accompanying figures, the advantages and the spirit of the present invention can be better understood.

BRIEF DESCRIPTION OF THE DRAWINGS

FIGS. 2A to 2C illustrate the processes of the training stage according to the embodiments of the present invention;

FIGS. 4A and 4B illustrate the 2D hidden Markov model process according to the embodiments of the present invention, wherein FIG. 4A is puzzle-form process and FIG. 4B is oblique-form process;

FIGS. 5A and 5B illustrate the schematic diagram of the weight of the 2D hidden Markov model process according to the embodiments of the present invention, wherein FIG. 5A is puzzle-form process and FIG. 5B is oblique-form process;

DETAILED DESCRIPTION

Figure 1:
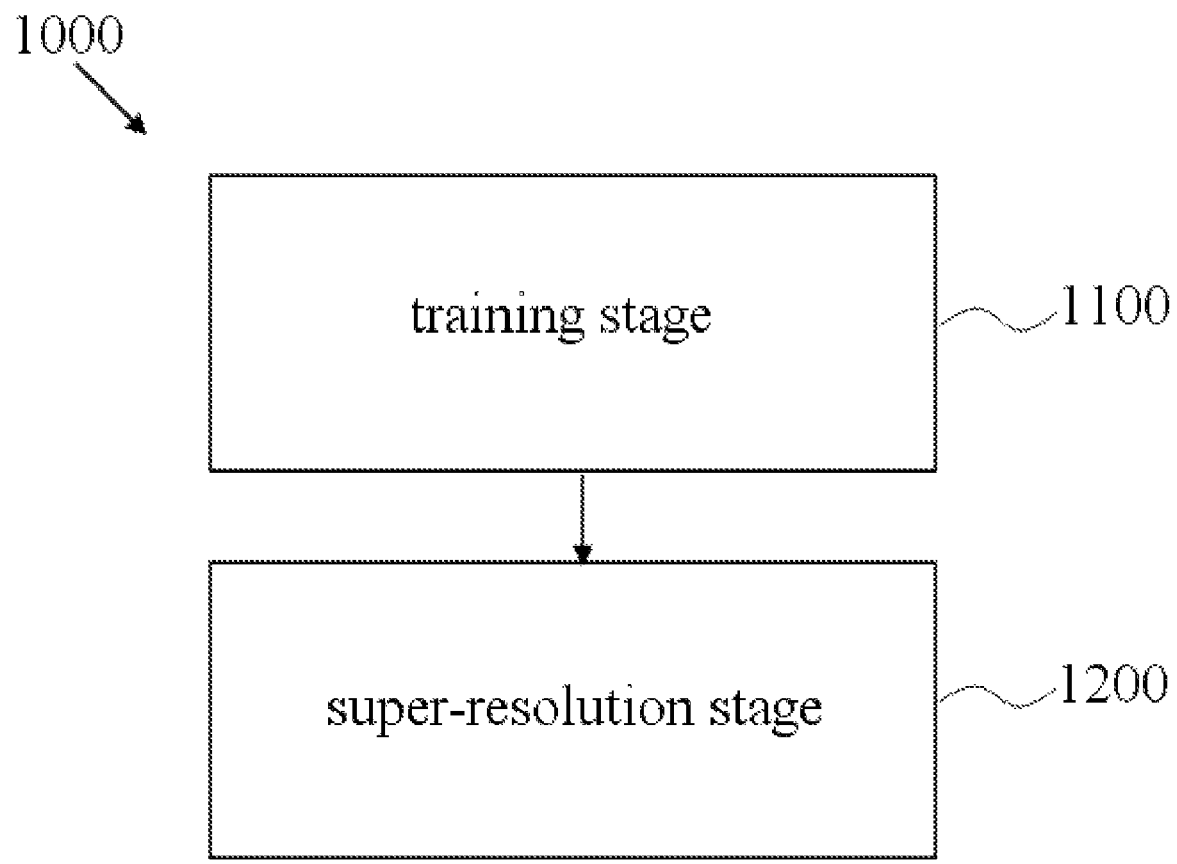
FIG. 1 illustrates the processes of a super-resolution method according to the embodiments of the present invention.
Figure 6:
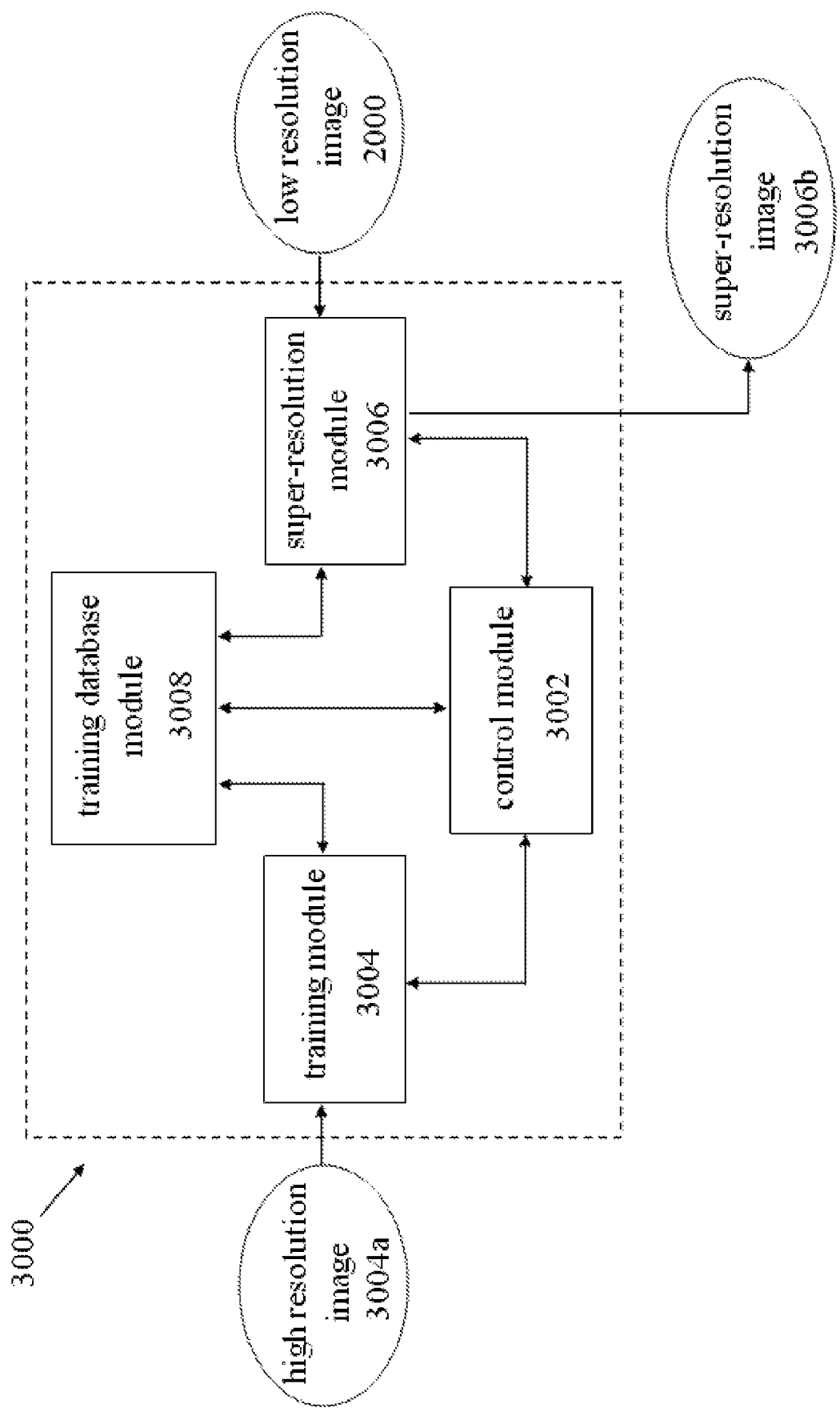
FIG. 6 illustrates the super-resolution system according to the embodiments of the present invention.
Figure 7:
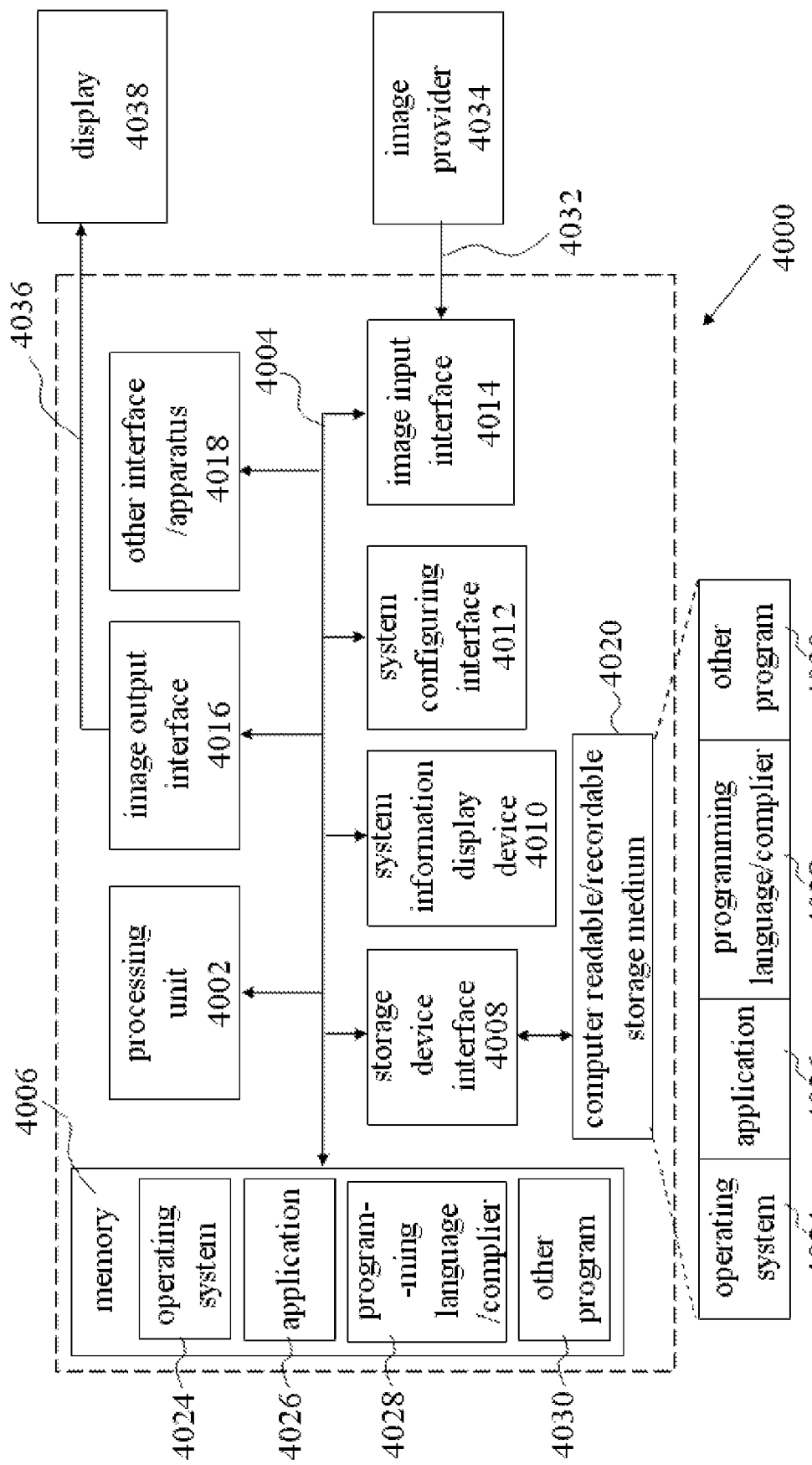
FIG. 7 illustrates an exemplary hardware for implementing the embodiments of the present invention.

FIG. 1 shows the processes of a super-resolution method for image display according to the embodiments of the present invention. In FIG. 1, the super-resolution method for image display 1000 includes a training stage 1100 and a super-resolution stage 1200. The detailed processes will be explained in the following description. For implementing the processes or stages, a super-resolution system 3000 is provided in the embodiments of the present invention, as shown in FIG. 6. For implementing the super-resolution system 3000, an exemplary hardware/operational environment is provided in the embodiments of the present invention, as shown in FIG. 7. In FIG. 7, a computer 4000 includes a processing unit 4002 (such as a processor or, more particularly, a programmable processor). For example, via a bus 4004, the processing unit 4002 is coupled to a memory 4006, a storage device interface 4008, a system information display device 4010, a system configuring interface 4012, an image input interface 4014, an image output interface 4016, and other interface/apparatus 4018, wherein the storage device interface 4008 includes PATA, SATA, e-SATA, USB, MS, CF, SD, MMC or other common interface which is for connecting a computer readable storage medium 4020.

A computer readable storage medium 4020 may include external or integrated CD/DVD/Blu-ray drive, hard/soft disk drive, memory card, or other one or more mediums. In some embodiments, processing unit 4002 and computer readable storage medium 4020 may be integrated into a micro processor. The computer readable storage medium 4020 and memory 4006 may store operating system 4024, application (software program) 4026, programming language and corresponding compiler 4028, and other programs 4030, for implementing the computer program product according to the embodiments of the present invention.

By utilizing the image input interface 4014, the high resolution images 3004a (see FIG. 6) and the low resolution images 2000 (see FIG. 6) may be provided from an external image provider 4034, via the wired/wireless image input channel 4032. The image input channel 4032 may comprise internet cable, TV signal cable, wireless base station, etc. It should be appreciated that the above computer readable storage medium 4020 may also provide image input. After performing the super-resolution method 1000 by the super-resolution system 3000, the resulted super-resolution image 3006b may be provided to an external or integrated display 4038 by utilizing the image output interface 4016 via the image output channel 4036. The system information display device 4010 may be another display, for displaying the system status information. The system configuring information 4012 may comprise, for example, mouse, keyboard, touch panel, or other one or more input devices and their related interfaces. Further, the computer 4000 may include basic input and output system (BIOS). However, the above description is only an example for illustrating the computer hardware and the operating environment but not to limit the scope of the present invention. The present invention may be implemented with different forms, for being more suitable to various demands and conditions. For example, the present invention may be implemented as a set-top box connected to a television for receiving the video signals. In this example, some components may be integrated into a micro processor for reducing the volume for convenience. The keyboard, mouse, and/or optical disk drive may be optional. The program may be burned into a single micro processor. Furthermore, the quantity of each of the components may not limit to one. The quantity may be changed depending on the specific requirement. Some of the components may be deleted, while some other components may be added.

Figure 2A:
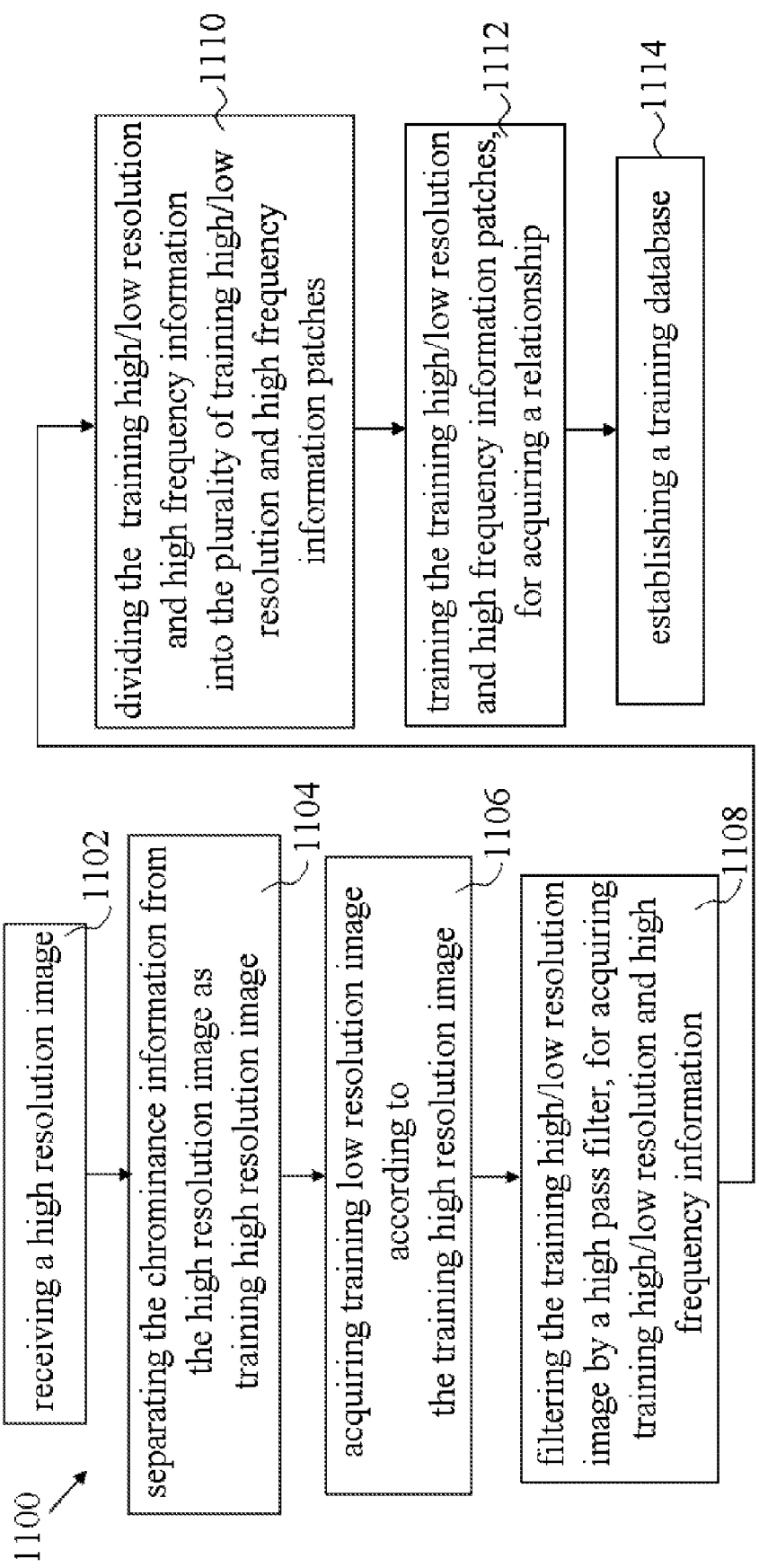

FIGS. 2A to 2C show the processes of the training stage according to the embodiments of the present invention. The processes may be implemented by utilizing the software/hardware shown in FIG. 6 and FIG. 7, for facilitating to provide concrete and useful computer readable result. The methods, processes, or stages, may be performed as computer readable digital data recorded as computer programs or instructions stored in the computer readable storage medium by information technology.

In FIG. 2A, the training stage 1100 include the steps of: at step 1102, for example, The system 3000 utilizes the image input interface 4014 to receive a high resolution image 3004a (or each of the frames of a video sequence) and stores the high resolution image 3004a in the training database module 3008, buffer (not shown), memory 4006, or in the computer readable storage medium 4020 via storage device interface 4008; upon the instructions, the processing unit 4002 may call and execute the application 4026, such as the training module 3004 of the super-resolution system 3000 in the embodiments; at step 1004, separating, by the training module 3004, the chrominance information from the high resolution image 3004a, for treating as training high resolution image; similarly, the separated training high resolution image may be stored in the training database module 3008, buffer, memory 4006, or in the computer readable storage medium 4020 via the storage device interface 4008, for facilitating the following steps; at step 1106, upon the given instructions or the default configuration, acquiring, by the training module 3004, the training low resolution image according to the training high resolution image; similarly, the acquired training low resolution image may also be stored in the training database module 3008, the buffer, the memory 4006, or in the computer readable storage medium 4020 via the storage device interface 4008, for facilitating the following steps; at step 1108, capturing, by the processing unit 4002, the stored training high resolution image and the training low resolution image, and high-pass filtering, by the training module 3004, the captured training high resolution image and the training low resolution image, respectively, for acquiring training high resolution and high frequency image and training low resolution and high frequency image; at step 1110, dividing, by the training module 3004, the training high resolution and high frequency image and the training low resolution and high frequency image into a plurality of training high resolution and high frequency image patches and a plurality of training low resolution and high frequency information patches, respectively, and storing these patches in the memory 4006 or in the computer readable storage medium 4020; at step 1112, calling and executing, by the processing unit 4002, the training module 3004 to train the training high resolution and high frequency information patches and the training low resolution and high frequency information patches, for acquiring a relationship between them; at step 1114, establishing a trained database in the training database module 3008. The skilled in the art should appreciate that the following steps may utilize the similar software/hardware configuration as mentioned above. For brevity, some details in the following steps which are similar to the above description may be omitted.

In one of the embodiments according to the present invention, the step 1104 is implemented by transforming the color space of the high resolution image into YCbCr format (luminance, blue color difference, and red color difference). By separating the luminance and the chrominance of the high resolution image and processing the chrominance while neglecting the luminance, the quantity of the data and the complexity of the computation of the high resolution image may be greatly reduced.

In one of the embodiments according to the present invention, as shown in FIG. 2B, the step 1106 further comprises: at step 1106a, providing a blurring process by the training module 3004; at step 1106b, providing a down-sampling process by the training module 3004; and at step 1106c, providing an up-sampling process by the training module 3004. The purpose of implementing the blurring process (step 1106a) is to make the training high resolution image lose its high frequency image information. The down-sampling process (step 1106b) and the up-sampling process (step 1106c) may be implemented by utilizing bilinear interpolation process, for making the training high resolution image lose some of its pixel information after losing its high frequency image information, to generate a training low resolution image. The training low resolution image may be stored in the training database module 3008.

In one of the embodiments according to the present invention, the high-pass filtering process may be implemented by utilizing the Fourier transformation process, for transferring an image from the space domain to the frequency domain. The low frequency part of the frequency domain may be filtered by a mask and left the high frequency part. By such processes, the training high resolution image and the training low resolution image may be treated with high-pass filtering process by a high-pass filter, for acquiring the training high resolution and high frequency information and the training low resolution and high frequency information. The "high frequency" or "low frequency" used herein generally refers to the spatial frequency. In general, the high frequency part may represent the portion of the image with relative significant change. Therefore, picking the features of an image by capturing its high frequency parts and neglecting its low frequency parts may reduce the data volume.

In one of the embodiments according to the present invention, at step 1110, when the system divides the image into a plurality of patches, it is intended to provide the training low resolution and high frequency information patches with a larger size than the training high resolution and high frequency information patches, for facilitating the compatibility process. For example, a training low resolution and high frequency information patch may contain 7×7 pixels, and a training high resolution and high frequency information patch may contain 5×5 pixels. It is useful on computing the compatibility by utilizing the additional portions (pixels) of the low resolution and high frequency information patches, when the system 3000 superimposes and trains the high resolution and high frequency information patches with the low resolution and high frequency information patches for acquiring their relationship. By these processes, a better relationship can be provided. The more detailed training processes are as follows.

In one of the embodiments according to the present invention, for acquiring the relationship between the training high resolution and high frequency information patches and the training low resolution and high frequency information patches, as shown in FIG. 2C, the step 1112 may further include the steps of: at step 1112a, the training module 3004 computes the sum of color values of the plurality of training high resolution and high frequency information patches and the plurality of training low resolution and high frequency information patches, respectively; at step 1112b, the training module 3004 records the corresponding address of each of the sum of color values of the high resolution and high frequency information patches, stored in the training database module 3008, related to the training low resolution and high frequency information patches; at step 1112c, the training module 3004 matches similar patches according to the sum of color values corresponding to the high frequency information stored in the training database module 3008; followed by matching pixels by the training module 3004 at step 1112d; at step 1112e, thereafter, the training module 3004 matches and classifies the similar patches according to result of matching pixels. The result of these steps may be stored in the training database module 3008.

Since the quantity of the patches (the training high resolution and high frequency information patches and the training low resolution and high frequency information patches) is quite considerable, in the preferred embodiments of the present invention, the training module 3004 is utilized to compute the sum of the color values for each of the patches (1112a) and to record the corresponding address for the sum of the color values for each of the patches (1112b). The sums of the color values are then be primarily matched (1112c). If the sums of the color values are similar, then the further matching of the individual pixels within the patches is performed (1112d). If the result of the pixel matching is similar, then the matched patches may be viewed as the patches of the same class and thus be classified (1112e), which is referred as "similar patches" herein. By these processes, the similar patches may be classified together and performed statistical analysis, for facilitating reducing the storage volume for storing the patches. Further, there are some superimpositions between each of the high resolution and high frequency information patches. In some embodiments of the present invention, the superimpositions are utilized to calculate the square of the difference. The patches with the least square of the difference are assigned as the similar neighboring patches. After the above processes, a trained database may be established in step 1114, as shown in FIG. 2A.

Figure 3A:
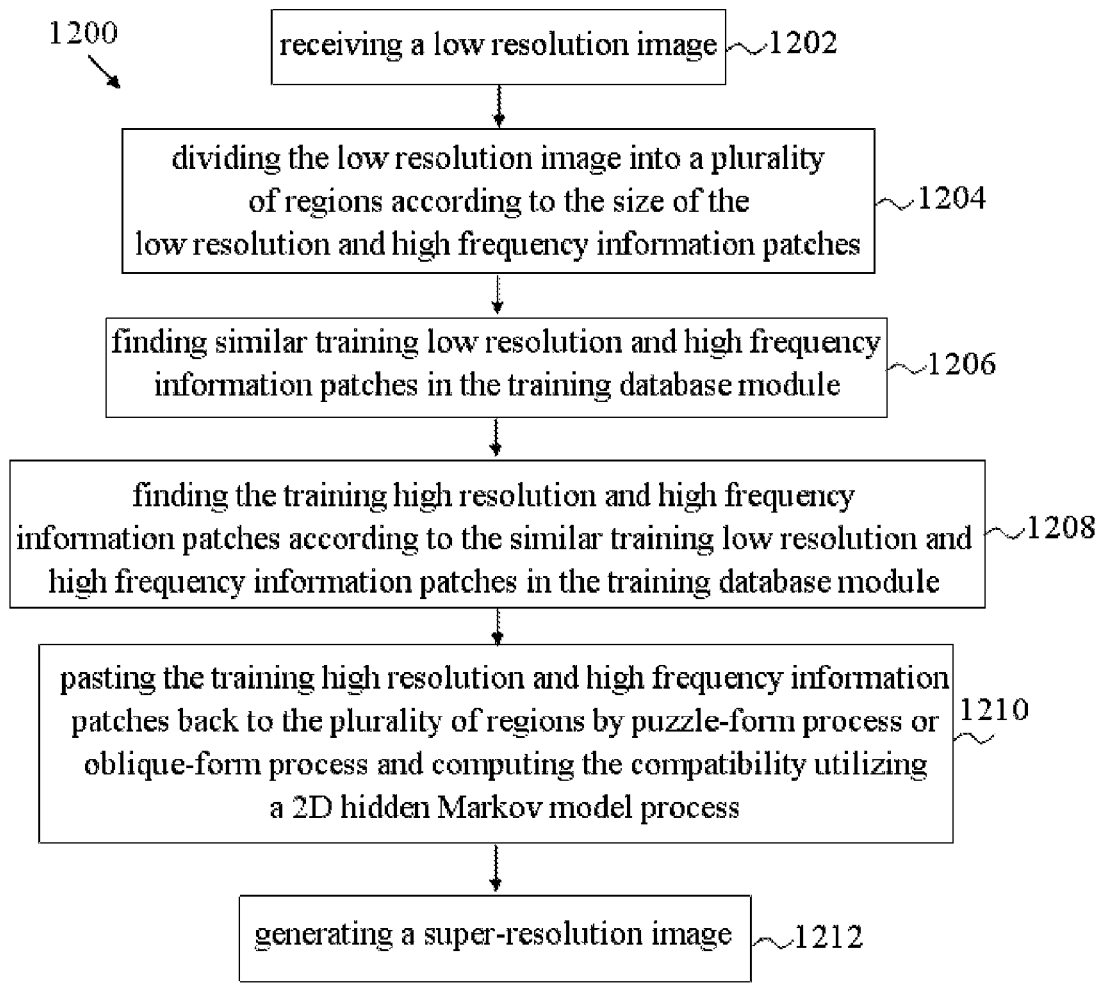
FIGS. 3A and 3B illustrate the processes of the super-resolution stage according to the embodiments of the present invention.
Figure 3B:
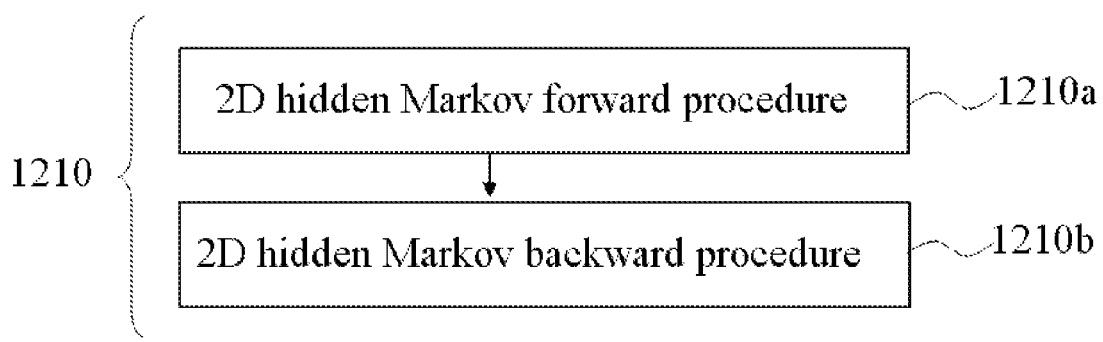

After establishing the trained database, the process is move from the training stage 1100 to the super-resolution stage 1200. FIGS. 3A and 3B show the processes of the super-resolution stage 1200 according to the embodiments of the present invention. The super-resolution stage 1200 may be implemented with the software/hardware shown in FIG. 6 and FIG. 7. In FIG. 3A, the super-resolution stage 1200 may comprise the steps of: at step 1202, the super-resolution module 3006 receives a low resolution image 2000 which is the low resolution image being intended to perform super-resolution process; at step 1204, the super-resolution module 3006 divides the low resolution image 2000 into a plurality of regions according to the size of the low resolution and high frequency information patches; at step 1206, the super-resolution module 3006 finds the training low resolution and high frequency information patches in the training database module 3008; at step 1208, the super-resolution module 3006 finds the training high resolution and high frequency information patches according to the similar training low resolution and high frequency information patches in the training database module 3008; at step 1210, the super-resolution module 3006 pastes the training high resolution and high frequency information patches back to the plurality of regions of the low resolution 2000 by the puzzle-form process or the oblique-form process and to compute the compatibility by utilizing a 2D hidden Markov model process; and at step 1212, the super-resolution module 3006 generates a super-resolution image 3006b.

Figure 4A:
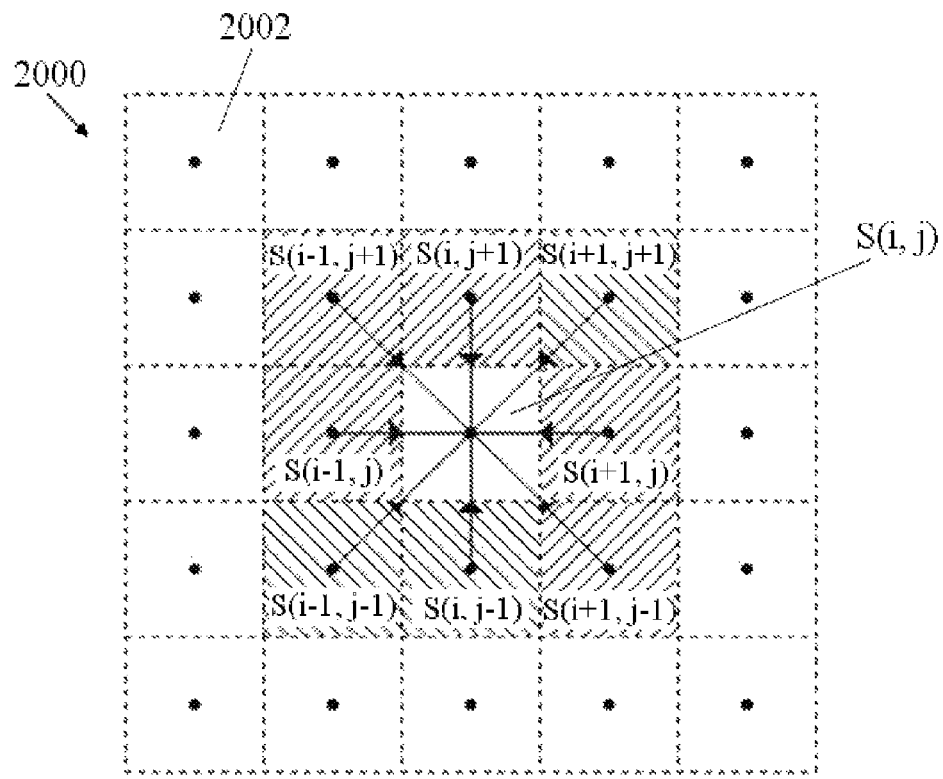
Figure 4B:
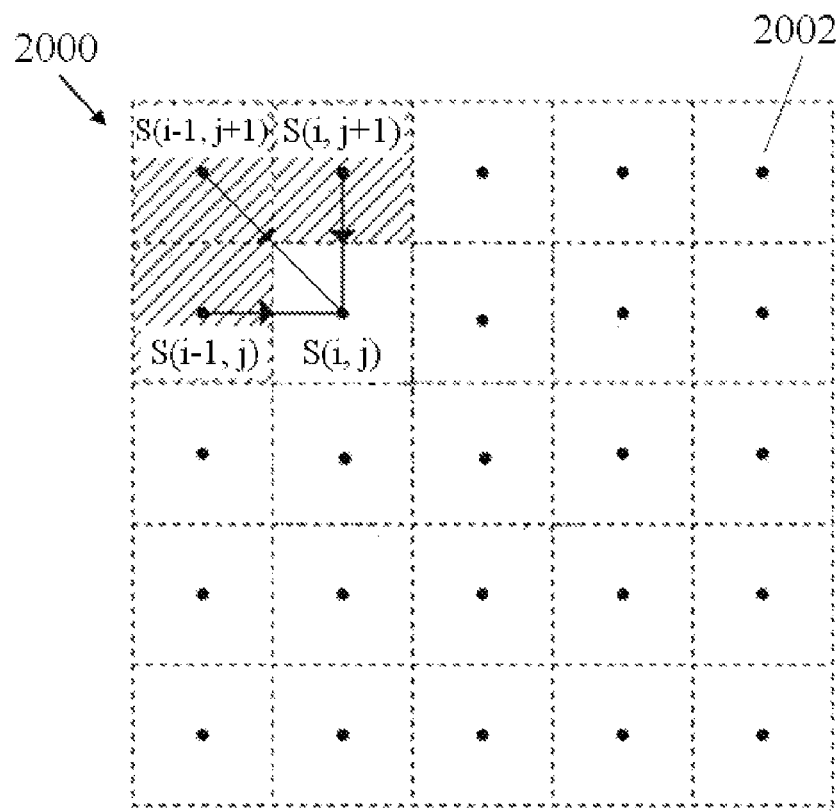

In one of the embodiments of the present invention, at step 1210, utilizing the super-resolution module 3006 to paste the training high resolution and high frequency information patches back to the plurality of regions of the low resolution 2000 by the puzzle-form process or the oblique-form process is shown as FIGS. 4A and 4B. The puzzle-form process is referred to pasting by loop, from the relative outer loop to the relative inner loop. The oblique-form process is referred to pasting by oblique line, from the left-up to the right-down or from the right-up to the left-down direction (it is preferred, but not limited to, from the left-up to the right-down). The preferred oblique angle comprises, but not limited to, 90 degree.

The hidden Markov model is a set of a statistical model, which is utilized to describe the character process of state-transitions. The general hidden Markov model comprises a limited amount of states, state-transition matrices, and a set of initial probabilities of the states. Markov network is a network model to predict the following states based on a given state. Therefore, in general Markov model, the following states are observable to the observer. However, in the hidden Markov model, the following states are not directly observable to the observer. Each of the states corresponds to a possible output signal which has a probability distribution. Hence, in the hidden Markov model, it needs to find the most possible state-transitions and the output probabilities.

In some embodiments of the present invention, when applying the hidden Markov model to the low resolution image 2000, each of the plurality of regions divided from the low resolution image 2000 is given one to five state patches. An initial probability may be acquired from the similarity of each of the state patches and the corresponding regions. Among the five state patches of each of the regions, there is also a transition probability. Therefore, the compatibility may be computed.

FIG. 4A shows a puzzle-form process for the 2D hidden Markov model. For low resolution image 2000, it has been divided into a plurality of regions 2002 (only one region is marked, for brevity) in step 1204. In step 1208, the compatibility of each of the pasted patches and its neighboring eight regions is computed (compared). If the patch prepared for pasting is referred as S(i,j), the neighboring regions may be $N_1 = \{S(i-1,j), S(i-1,j-1), S(i,j-1), S(i+1,j-1), S(i+1,j), S(i+1,j+1), S(i,j+1), S(i-1,j+1)\}$, as the regions marked with oblique lines shown in FIG. 4A. FIG. 4B shows an oblique-form process for the 2D hidden Markov model. The compatibility of each of the pasted patches and its neighboring three regions is computed (compared). If the pasted patch is referred as S(i,j), the neighboring regions may be $N_2 = \{S(i-1,j), S(i-1,j+1), S(i,j+1)\}$, as the regions marked with oblique lines shown in FIG. 4B. The probabilities may be represented as:

$$P\{S(i,j)\} = i+K, j+L \in N_m,$$

$$\Sigma\{S(i+K,j+L)\} * e_{(i+K,j+L)},$$

where S(i,j) represents the regions under reconstruction; S(i+K, j+K) represent the several neighboring regions; K and L are the variables to present the neighboring positions; m is the selective mode of the hidden Markov model, which m=1 is puzzle-form for comparing maximum eight neighboring regions and m=2 is oblique-form for comparing maximum three neighboring regions. The oblique-form process provides a faster processing speed.

Figure 5A:
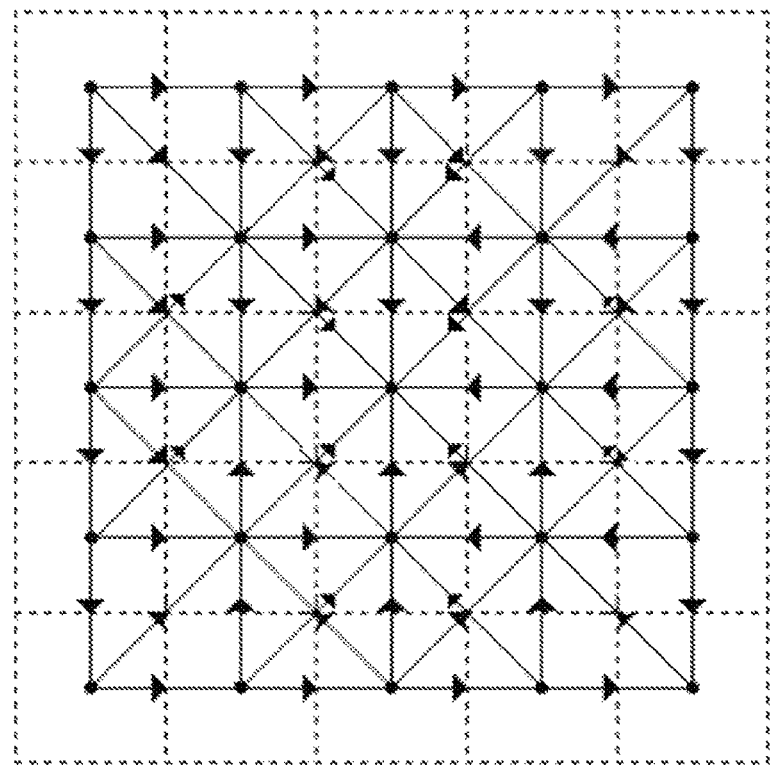
Figure 5B:
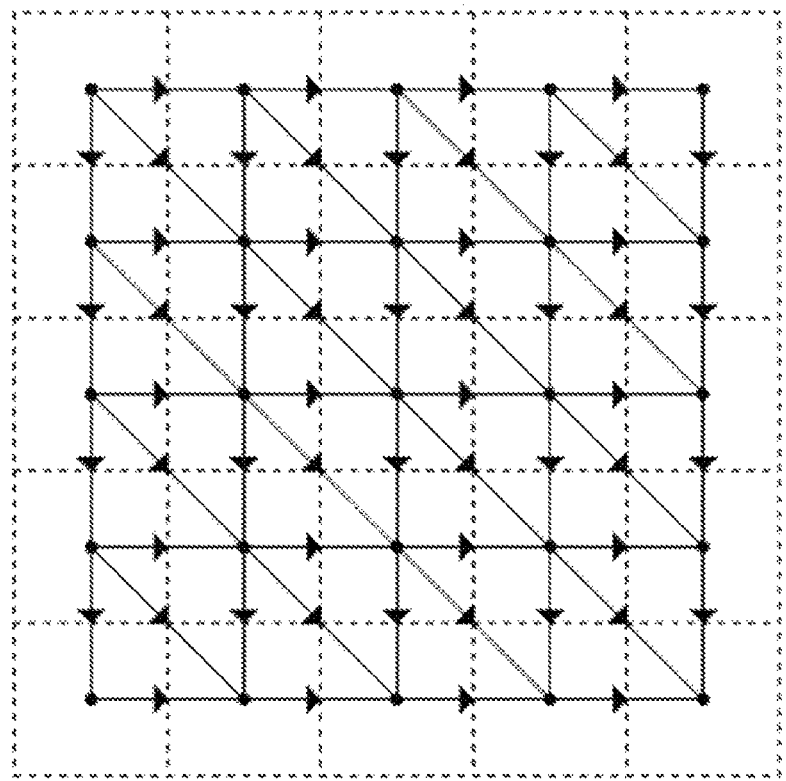

In the preferred embodiments, as shown in FIG. 3B, the step 1210 further comprises: at step 1210a, utilizing the super-resolution module 3006 to perform forward pass process for 2D hidden Markov model process; and at step 1210b, utilizing the super-resolution module 3006 to perform backward procedure for 2D hidden Markov model process. There is a corresponding transition probability for each of the patches and each of its neighboring regions. In FIG. 1210a, by the super-resolution module 3006, the weight is computed for each of the patches and the constructed neighboring regions. The weight is utilized as the transition probability for each pair of the neighbored regions, as shown in FIGS. 5A and 5B. FIG. 5A shows the schematic diagram of the weight for puzzle-form process for 2D hidden Markov model process, and FIG. 5B shows the schematic diagram of the weight for oblique-form process for 2D hidden Markov model process. At step 1210b, according to the weight computed at step 1210b, the training high resolution and high frequency information patch with the highest transition probability is pasted back to the designated region 2002 of the low resolution image 2000, for providing a high resolution image.

In the embodiments of the present invention, since the matching is performed by utilizing the hidden Markov model process, it takes shorter time than one by one matching processes and thus provides a better efficiency. Further, it may not need to perform recursive computation for seeking a better result. Furthermore, since the every pasted patch is matched with the neighboring three to eight regions, the error probability is lowered and the bad influence on the latter patches caused by the former mis-pasted patches is also reduced.

It should be noted that the reconstructed image may somehow different from the original image. Therefore, for evaluating the image quality after reconstruction, the PSNR (peak signal to noise ratio) index is utilized to confirm whether the result is qualified. The PSNR is an objective test data which represents a smaller distortion with a larger PSNR index. The reconstructed image provided by the super-resolution method according to the embodiment of the present invention is tested by the PSNR. The result proves that the reconstructed image provides a better quality. In the preferred embodiments, the PSNR is defined as:

$$PSNR = 10 \times \log\left(\frac{255^2}{MSE}\right),$$

$$MSE = \frac{\sum_{n=1}^{FrameSize}(I_n - P_n)^2}{FrameSize},$$

where $I_n$ refers to the $n^{th}$ pixel of the original image; $P_n$ refers to the $n^{th}$ pixel of the reconstructed image; the unit of PSNR is dB; in general, the larger the PSNR value, the smaller the distortion. In some embodiments of the present invention, the computed PSNR value with the original image and the reconstructed image may be larger or equal to about 28.14. It has a significant improvement, since the PSNR value of performing the general interpolation process is generally smaller than 27.

For performing the above processes, FIG. 6 shows a super-resolution system 3000. The super-resolution system 3000 comprises: a control module 3002, for control the operation of the system; a training module 3004, coupled to a high resolution image input and the control module 3002, for receiving a high resolution image 3004a and performing the training stage 1100; a super-resolution module 3006, coupled to a low resolution image input, a super-resolution image output, and the control module 3002, for receiving a low resolution image 2000, performing the super-resolution stage 1200, and generating and output a super-resolution image 3006b; a training database module 3008, coupled to the control module 3002, the training module 3004, and the super-resolution module 3006, for providing database functionality and storing the data generated by the training stage 1100 and the super-resolution stage 1200.

The super-resolution system 3000 may be implemented by a computer with computing and storing ability, such as, but not limited to, the computer 4000 shown in FIG. 7. The computer may comprise input/output devices and interfaces for receiving the high resolution image 3004a and the low resolution image 2000. The super-resolution image 3006b may be displayed on an additional or integrated display monitor. In general, the computer may refer to workstation, server, personal computer, notebook, PDA, television, CD/DVD/

Blu-ray player, analog/digital set-top box, camera, video recorder, game player, or the combinations thereof. The super-resolution system 3000 may be implemented by the above-mentioned software, hardware, firmware, and/or the combination thereof. The super-resolution system 3000 may be stored in a computer readable storage medium, for performing the super-resolution method 1000. The "image" used herein may refer to static image (such as picture or graph) or frames of dynamic image (such as video sequence). The image may be transferred by wired/wireless and/or analog/digital way. The image may also be transferred by internet or local network.

In some embodiments of the present invention, a computer readable storage medium which stores program is provided. When computer load and execute the program, the super-resolution method for image display may be performed.

In some embodiments of the present invention, a computer software product stored in a computer readable storage medium is provided. When computer load and execute the computer software product, the super-resolution method for image display may be performed.

The preferred embodiments of the present invention are provided above. Along with the examples and the accompanying figures, the skill in the art should better understand the various purposes, features, and advantages of the present invention. However, it should be noted that these embodiments are for illustrating but not for limiting the scope of the present invention to some details of a specific embodiment. Without departing from the spirit of the present invention, the modification and variation based on the teaching of the present invention may be included in the scope of the present invention. The scope of the present invention should depend on the following claims and the equivalents.

What is claimed is:

1. A super-resolution method for image display, the method comprising:
   utilizing a high resolution image to acquire a plurality of training high resolution and high frequency information patches and a plurality of training low resolution and high frequency information patches;
   training with said plurality of training high resolution and high frequency information patches and said plurality of training low resolution and high frequency information patches, for acquiring a relationship for establishing a training database;
   receiving a low resolution image;
   dividing said low resolution image into a plurality of regions according to the size of said plurality of training low resolution and high frequency information patches;
   finding one of said plurality of training low resolution and high frequency information patches being similar to each of said plurality of regions, and finding one of said plurality of training high resolution and high frequency information patches corresponding to said one of said plurality of training low resolution and high frequency information patches from said training database;
   controlling a super-resolution module to paste said high resolution and high frequency information patches back to said plurality of regions by puzzle-form process or oblique-form process and to compute the compatibility utilizing a two-dimensional hidden Markov model process by a processor; and
   generating a super-resolution image.

2. The method according to claim 1, further comprising:
   separating the chrominance information from said high resolution image as a training high resolution image;
   acquiring a training low resolution image according to said training high resolution image;
   filtering, by a high-pass filter, said training high resolution image and said training low resolution image, for acquiring training high resolution and high frequency information and training low resolution and high frequency information; and
   dividing said training high resolution and high frequency information and said training low resolution and high frequency information into said plurality of training high resolution and high frequency information patches and said plurality of training low resolution and high frequency information patches.

3. The method according to claim 2, wherein separating said chrominance information from said high resolution image is implemented by transforming the color space of said high resolution image into YCbCr format.

4. The method according to claim 2, wherein acquiring said training low resolution image comprises blurring process, down-sampling process, and up-sampling process.

5. The method according to claim 1, wherein acquiring said corresponding relationship comprising:
   computing sum of color values of said plurality of training high resolution and high frequency information patches and said plurality of training low resolution and high frequency information patches;
   recording corresponding address of each of said sum of color values;
   matching similar patches according to said sum of color values;
   matching pixels; and
   matching and classifying further said similar patches according to the result of said matching pixels.

6. The method according to claim 1, wherein said two-dimensional hidden Markov model process comprises forward procedure and backward procedure.

7. The method according to claim 1, wherein said oblique-form process comprises computing compatibility of the neighboring three regions.

8. The method according to claim 1, wherein said puzzle-form process comprises computing compatibility of the neighboring eight regions.

9. A super-resolution method for image display, the method comprising:
   receiving a low resolution image;
   dividing said low resolution image into a plurality of regions;
   finding high resolution patches in a pre-training database;
   controlling a super-resolution module, by a processor, to paste said high resolution patches back to said plurality of regions by puzzle-form process or oblique-form process and to compute the compatibility utilizing a two-dimensional hidden Markov model process; and
   generating a super-resolution image.

10. The method according to claim 9, wherein said two-dimensional hidden Markov model process comprises forward procedure and backward procedure.

11. The method according to claim 9, wherein said oblique-form process comprises computing compatibility of the neighboring three regions.

12. The method according to claim 9, wherein said puzzle-form process comprises computing compatibility of the neighboring eight regions.

* * * * *